(12) United States Patent
Fujimoto et al.

(10) Patent No.: US 9,771,809 B2
(45) Date of Patent: Sep. 26, 2017

(54) IMPINGEMENT COOLING MECHANISM, TURBINE BLADE AND COMBUSTOR

(71) Applicant: IHI Corporation, Tokyo (JP)

(72) Inventors: Shu Fujimoto, Tokyo (JP); Chiyuki Nakamata, Tokyo (JP); Yoji Okita, Tokyo (JP)

(73) Assignee: IHI CORPORATION (JP)

( * ) Notice: Subject to any disclaimer, the term of this patent is extended or adjusted under 35 U.S.C. 154(b) by 343 days.

(21) Appl. No.: 14/301,601

(22) Filed: Jun. 11, 2014

(65) Prior Publication Data

US 2014/0290256 A1    Oct. 2, 2014

Related U.S. Application Data

(63) Continuation of application No. PCT/JP2012/082569, filed on Dec. 14, 2012.

(30) Foreign Application Priority Data

Dec. 15, 2011    (JP) ................. 2011-274878

(51) Int. Cl.
*F01D 5/00* (2006.01)
*F01D 5/18* (2006.01)
*F23R 3/00* (2006.01)

(52) U.S. Cl.
CPC ............. *F01D 5/187* (2013.01); *F01D 5/189* (2013.01); *F23R 3/002* (2013.01);
(Continued)

(58) Field of Classification Search
CPC ............. Y02E 20/16; F05D 2260/2322; F05D 2260/205; F05D 2260/201;
(Continued)

(56) References Cited

U.S. PATENT DOCUMENTS 4,105,364 A    8/1978  Dodd ............................. 416/97
4,338,780 A *  7/1982  Sakamoto ............... F01D 5/087
                                                     415/114
(Continued)

FOREIGN PATENT DOCUMENTS

CN    1773080 A    5/2006
EP    0416542 A1   3/1991
(Continued)

OTHER PUBLICATIONS

Chinese Office Action, dated Mar. 11, 2015, issued in corresponding Chinese Patent Application No. CN201280061033.6. English translation of Search Report. Total 9 pages.
(Continued)

*Primary Examiner* — Peter Helvey
(74) *Attorney, Agent, or Firm* — Ostrolenk Faber LLP

(57) ABSTRACT

The present invention relates to an impingement cooling mechanism that ejects a cooling gas toward a cooling target (2) from a plurality of impingement holes (3b) formed in a facing member (3) that is disposed facing the cooling target (2). Blocking members (5) that block a crossflow (CF), which is a flow formed by the cooling gas after being ejected from the impingement holes (3b), are installed on at least the upstream side of the crossflow (CF) with respect to at least a portion of the impingement holes (3b). Turbulent flow promoting portions (6) are provided in the flow path (R) of the crossflow (CF) regulated by the blocking members (5).

9 Claims, 8 Drawing Sheets

(52) U.S. Cl.
CPC ............... *F05D 2260/201* (2013.01); *F05D 2260/2212* (2013.01); *F05D 2260/22141* (2013.01); *F23R 2900/03044* (2013.01); *Y02T 50/676* (2013.01)

(58) Field of Classification Search
CPC ... F05D 2260/2212; F05D 2260/22141; F01D 5/187; F01D 5/189; F02C 7/16; F23R 3/002; F23R 2900/03044; Y02T 50/676
USPC .......................................... 60/752; 416/96 R
See application file for complete search history.

(56) References Cited

U.S. PATENT DOCUMENTS

| | | | | |
|---|---|---|---|---|
| 4,399,652 | A * | 8/1983 | Cole | F02C 3/22 60/39.465 |
| 4,592,204 | A * | 6/1986 | Rice | F01D 5/185 60/39.17 |
| 4,896,499 | A * | 1/1990 | Rice | F01D 5/185 60/39.182 |
| 4,991,394 | A * | 2/1991 | Wright | F02C 7/185 60/226.1 |
| 5,144,794 | A * | 9/1992 | Kirikami | F01D 5/081 415/115 |
| 5,303,544 | A * | 4/1994 | Kobayashi | F01K 23/08 60/39.182 |
| 5,533,864 | A | 7/1996 | Nomoto et al. | |
| 5,775,091 | A * | 7/1998 | Bannister | F01D 5/084 60/39.17 |
| 5,938,975 | A * | 8/1999 | Ennis | C06D 5/00 252/373 |
| 5,953,900 | A * | 9/1999 | Bannister | F01D 25/12 60/39.17 |
| 5,983,623 | A * | 11/1999 | Aoki | F01D 5/187 415/114 |
| 6,065,282 | A * | 5/2000 | Fukue | F02C 7/185 415/115 |
| 6,089,012 | A * | 7/2000 | Sugishita | F01K 23/106 60/39.182 |
| 6,094,905 | A * | 8/2000 | Fukuyama | F01D 5/06 415/115 |
| 6,116,027 | A * | 9/2000 | Smith | F02C 6/10 60/648 |
| 6,185,924 | B1 * | 2/2001 | Matsumoto | F01D 5/082 415/110 |
| 6,244,039 | B1 * | 6/2001 | Sugishita | F01K 23/106 60/39.182 |
| 6,272,844 | B1 * | 8/2001 | Rakhmailov | F02C 6/20 416/95 |
| 6,321,449 | B2 * | 11/2001 | Zhao | 29/890.01 |
| 6,324,829 | B1 * | 12/2001 | Kita | F01K 23/108 60/39.182 |
| 6,367,242 | B1 * | 4/2002 | Uematsu | F02C 7/18 60/39.182 |
| 6,389,797 | B1 * | 5/2002 | Sugishita | F01K 23/106 60/39.182 |
| 6,588,197 | B2 * | 7/2003 | Tanaka | F01K 23/108 60/39.182 |
| 7,416,137 | B2 * | 8/2008 | Hagen | F01K 21/047 237/12.1 |
| 7,900,458 | B2 * | 3/2011 | James | B23P 15/04 415/115 |
| 8,689,566 | B1 * | 4/2014 | Coney | F01K 23/103 60/39.5 |
| 2001/0023581 | A1 * | 9/2001 | Ojiro | F01D 11/24 60/39.182 |
| 2002/0174659 | A1 * | 11/2002 | Viteri | H01M 8/04022 60/780 |
| 2003/0037534 | A1 * | 2/2003 | Sugishita | F01K 23/106 60/39.182 |
| 2003/0065436 | A1 * | 4/2003 | Hyakutake | F01D 19/02 701/100 |
| 2004/0003583 | A1 * | 1/2004 | Uematsu | F01K 23/106 60/39.182 |
| 2004/0139746 | A1 * | 7/2004 | Soechting | F01D 9/023 60/752 |
| 2005/0066664 | A1 * | 3/2005 | Shibata | F02C 7/12 60/775 |
| 2007/0234702 | A1 * | 10/2007 | Hagen | B60H 1/032 60/39.01 |
| 2007/0295011 | A1 * | 12/2007 | Suciu | F01D 5/022 60/772 |
| 2010/0034638 | A1 | 2/2010 | Chambers | 415/115 |
| 2010/0183428 | A1 | 7/2010 | Liang | |
| 2011/0016884 | A1 * | 1/2011 | Hashimoto | F01D 5/081 60/806 |
| 2012/0247121 | A1 * | 10/2012 | Kitamura | F01D 11/24 60/785 |
| 2012/0247125 | A1 * | 10/2012 | Budmir | F01D 9/023 60/805 |
| 2014/0090384 | A1 * | 4/2014 | McBrien | F23R 3/002 60/754 |
| 2014/0096523 | A1 * | 4/2014 | Coney | F01K 23/10 60/650 |
| 2014/0238028 | A1 * | 8/2014 | Yamane | F01D 5/189 60/752 |
| 2014/0290256 | A1 * | 10/2014 | Fujimoto | F01D 5/189 60/752 |
| 2014/0290257 | A1 * | 10/2014 | Okita | F01D 5/189 60/752 |
| 2015/0096304 | A1 * | 4/2015 | von der Esch | F01D 5/06 60/796 |
| 2016/0177740 | A1 * | 6/2016 | Slavens | F01D 5/187 60/755 |

FOREIGN PATENT DOCUMENTS

| | | |
|---|---|---|
| EP | 1091092 A2 | 4/2001 |
| EP | 1188902 A1 | 3/2002 |
| EP | 1655452 A2 | 5/2006 |
| JP | 63-080004 | 4/1988 |
| JP | 04-265403 | 9/1992 |
| JP | 08-338203 | 12/1996 |
| JP | 2010-174688 | 8/2010 |
| WO | WO 2011/020485 A1 | 2/2011 |

OTHER PUBLICATIONS

International Search Report and Written Opinion mailed Feb. 12, 2013 in corresponding PCT International Application No. PCT/JP2012/082569.

* cited by examiner

FIG. 3A
FIG. 3B
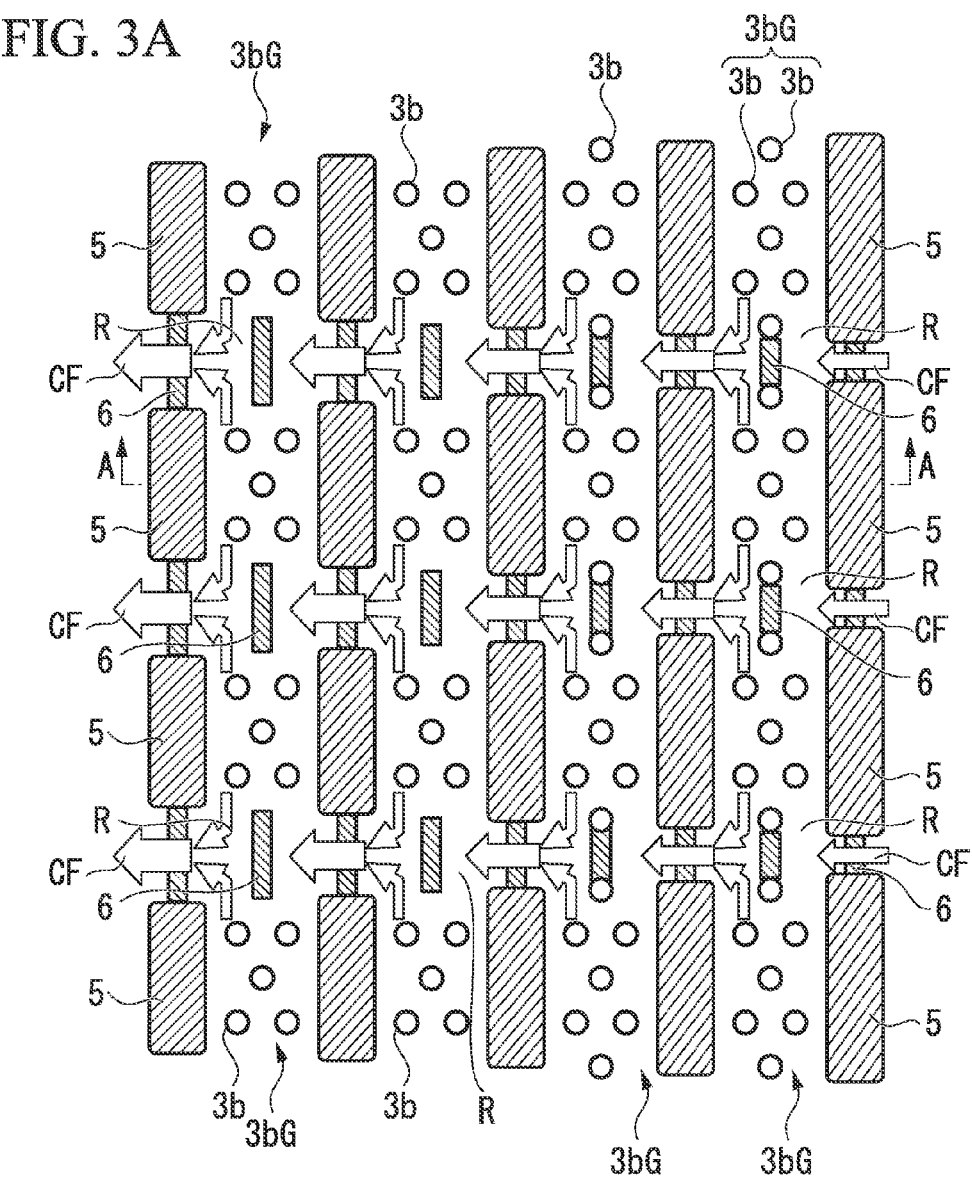
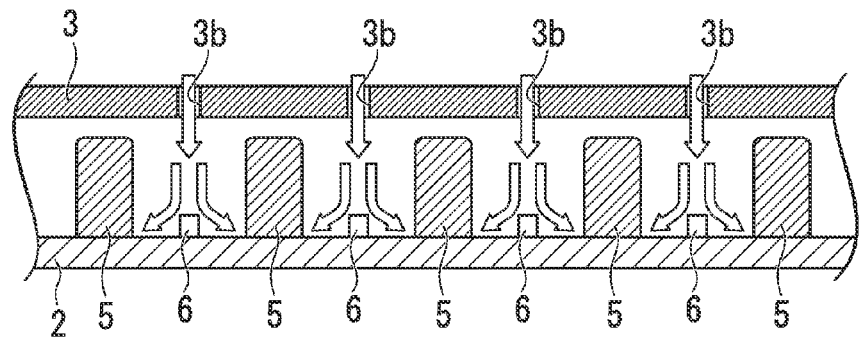

IMPINGEMENT COOLING MECHANISM, TURBINE BLADE AND COMBUSTOR

This application is a Continuation of International Application No. PCT/JP2012/082569, filed on Dec. 14, 2012, claiming priority based on Japanese Patent Application No. 2011-274878, filed Dec. 15, 2011, the content of which is incorporated herein by reference in their entity.

TECHNICAL FIELD

The present invention relates to an impingement cooling mechanism, a turbine blade and a combustor.

BACKGROUND ART

In turbine blades and combustors exposed to high-temperature environments, cooling is performed in order to inhibit a reduction in service life due to thermal damage. As a cooling mechanism that performs such cooling, an impingement cooling mechanism is often employed in the case of, for example, low pressure loss of a turbine nozzle or the like being required in a turbine blade. In an impingement cooling mechanism in a turbine blade, a hollow impingement plate in which a plurality of impingement holes are formed is installed in the interior of the turbine blade. Blowing a cooling gas that is supplied to the interior of the impingement plate against the inner wall surface of the blade body via the impingement holes cools the blade main body.

In this kind of impingement cooling mechanism, between the impingement plate and the blade main body, cooling gas after being ejected from the impingement holes flows along the surface of the impingement plate and inner surface of blade main body. The flow of this cooling gas after ejection is generally called a crossflow (hereinbelow, the flow of the cooling gas after ejection shall be described as a crossflow). However, when a crossflow is formed between the impingement plate and the blade main body, the cooling gas that is ejected from the impingement holes positioned on the downstream side of this crossflow ends up being swept into (entrained into) the crossflow, and therefore hindered from reaching the blade main body. Therefore, the further downstream of the crossflow, the more the impingement cooling effect decreases.

Conventionally, a structure has been proposed that provides, on the upstream side of the impingement hole, a shielding plate (shielding means) that shields the crossflow (for example, refer to Patent Document 1, Patent Document 2).

PRIOR ART DOCUMENTS

Patent Documents

[Patent Document 1] Japanese Unexamined Patent Application, First Publication No. 2010-174688
[Patent Document 2] Japanese Unexamined Patent Application, First Publication No. H08-338203

DISCLOSURE OF THE INVENTION

Problems to be Solved by the Invention

However, in the structure that is provided with the shielding plate mentioned above, although there is the effect of blocking the crossflow, the cooling effect by the crossflow cannot be sufficiently utilized. In a structure in which the aforementioned shielding plate is provided, the cooling effect due to impingement cooling is restricted.

The present invention was achieved in view of the aforementioned circumstances, and has as its object to further increase the cooling effect by an impingement cooling mechanism.

Means for Solving the Problems

According to the first aspect of the present invention, the impingement cooling mechanism ejects a cooling gas towards a cooling target from a plurality of impingement holes formed in a facing member that is disposed facing the cooling target. Blocking members that block the crossflow, which is the flow formed by the cooling gas after being ejected from the impingement holes, are disposed on at least the upstream side of the crossflow with respect to at least a portion of the impingement holes. Also, turbulent flow promoting portions are provided in the flow path of the crossflow regulated by the blocking members.

According to the second aspect of the present invention, in the impingement cooling mechanism according to the first aspect, the blocking members are provided so that the gap between adjacent blocking members on the upstream side of the crossflow becomes narrow, and the gap between adjacent blocking members on the downstream side of the crossflow becomes wide.

According to the third aspect of the present invention, in the impingement cooling mechanism according to the first aspect or the second aspect, the turbulent flow promoting portions are provided so that the turbulent flow promoting effect becomes low at the upstream side of the crossflow, and the turbulent flow promoting effect becomes high at the downstream side thereof.

According to the fourth aspect of the present invention, in the impingement cooling mechanism of any one of the first aspect to the third aspect, impingement holes are arranged in the flow path of the crossflow that is regulated by the blocking members.

According to the fifth aspect of the present invention, in the impingement cooling mechanism of any one of the first aspect to the fourth aspect, the blocking members are each formed having a plate-shaped portion and protruding portions that project out from the plate-shaped portion.

A turbine blade according to the sixth aspect of the present invention has the impingement cooling mechanism of any one of the first aspect to the fifth aspect.

A combustor according to the seventh aspect of the present invention has the impingement cooling mechanism of any one of the first aspect to the fifth aspect.

Effects of the Invention

According to the present invention, the blocking members that block the crossflow are disposed on at least the upstream side of the crossflow with respect to the impingement holes. For this reason, intrusion of the crossflow into the region between the impingement holes and the cooling target is inhibited. Accordingly, most of the cooling gas that is ejected from the impingement holes collides with (reaches) the cooling target without being influenced by the crossflow, and so the cooling effect by the impingement cooling increases.

Also, the turbulent flow promoting portions are provided in the flow path of the crossflow that is regulated by the blocking members. Accordingly, by disturbing the flow of the crossflow by the turbulent flow promoting portions, it is possible to increase the heat transfer coefficient between this crossflow and the cooling target.

Therefore, according to the present invention, it is possible to effectively utilize cooling gas of a limited flow rate that is supplied from the impingement holes, and further increase the cooling effect by the impingement cooling.

BRIEF DESCRIPTION OF THE DRAWINGS

FIG. 3A is a plan view that schematically shows the main portions of the inner surface side of the blade main body for describing the second embodiment of the present invention.

FIG. 3B is a drawing for describing the second embodiment of the present invention, being a cross-sectional view along A-A line of FIG. 3A.

EMBODIMENTS FOR CARRYING OUT THE INVENTION

Figure 1:
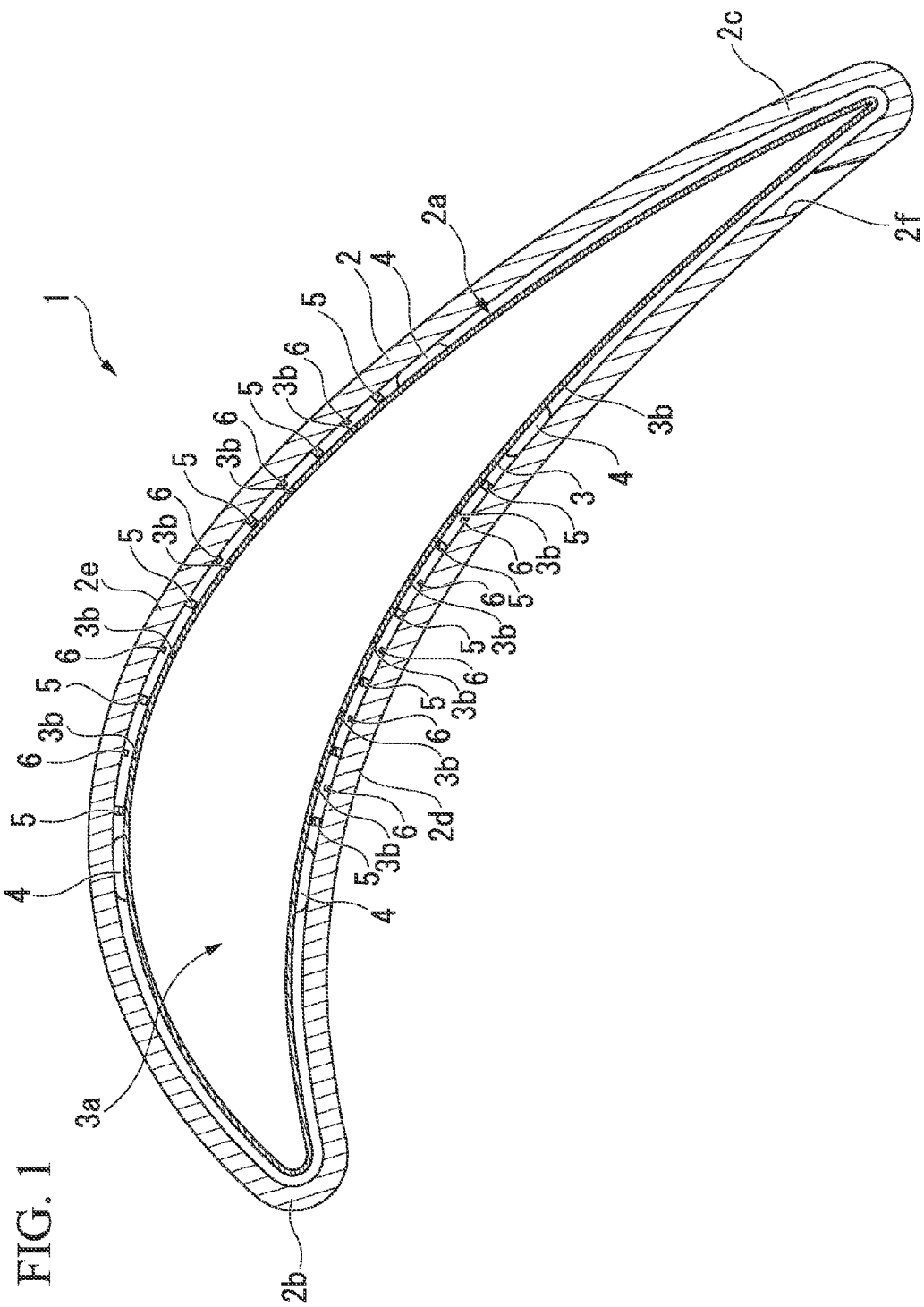
FIG. 1 is a cross-sectional drawing that shows an outline constitution of the first embodiment of the turbine blade according to the present invention.

Hereinbelow, details of the present invention shall be described with reference to the drawings. Note that in the drawings, the scale of each member is suitably altered in order to make each member a recognizable size.

First Embodiment

FIG. 1 is a cross-sectional view that shows the outline configuration of a turbine blade having the impingement cooling mechanism of the present embodiment. A turbine blade 1 is provided with a blade main body 2 and an impingement plate 3.

The blade main body 2 forms the outer shape of the turbine blade 1, and has therein a space (interior space) 2a, and the blade main body 2, which serves as the cooling target in the impingement mechanism, is provided with a leading edge portion (blade leading edge portion) 2b, a trailing edge portion (blade trailing edge portion) 2c, a front-side blade surface (blade front) 2d, and a back-side blade surface 2e. Also, a through-hole 2f that penetrates from the interior space 2a to the outer portion of the blade main body 2 is formed at the trailing edge portion 2c.

The impingement plate 3 has an analogous outer shape approximately equivalent to the outer shape of the interior space 2a of the blade main body 2, and functions as a facing member in the impingement mechanism. The impingement plate 3 is supported by plate supports 4 that connect the blade main body 2 and the impingement plate 3. Thereby, the impingement plate 3 is housed in the interior space 2a of the blade main body 2, in the state of being spaced apart by a fixed distance from the inner wall surface of the blade main body 2. The plate supports 4 are protruding portions that are fixed to the surface of the impingement plate 3, and are arranged at a nearly uniform distribution on the surface of the impingement plate 3.

The distal end side of these plate supports 4 abuts the inner wall surface of the blade main body 2, whereby the impingement plate 3 is supported within the interior space 2a of the blade main body 2.

The impingement plate 3 has a space (interior space) 3a in the inner portion thereof. Many impingement holes 3b are formed from the interior space 3a towards the inner wall surface of the blade main body 2. Cooling gas is supplied to the interior space 3a. By doing so, the cooling gas is ejected from the impingement holes 3b to be blown against the inner wall surface of the blade main body 2, to thereby impingement-cool the blade main body 2.

The cooling gas that is ejected from the impingement holes 3b flows toward the trailing edge portion 2c between the impingement plate 3 and the inner wall surface of the blade main body 2. That is to say, a crossflow that flows toward the trailing edge portion 2c is formed by the cooling gas after ejection between the impingement plate 3 and the inner wall surface of the blade main body 2.

Figure 2A:
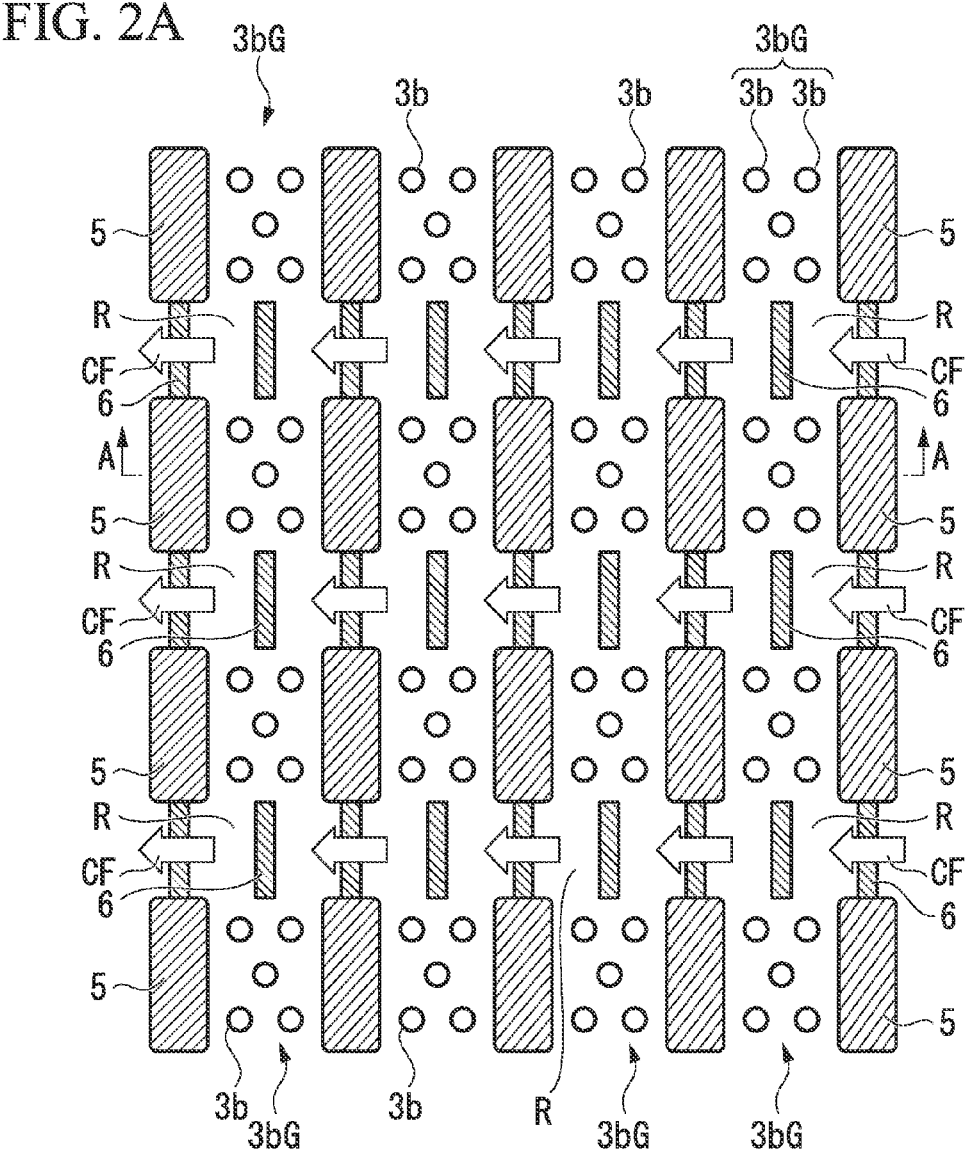
FIG. 2A is a plan view that schematically shows the main portions of the inner surface side of the blade main body for describing the first embodiment of the present invention.
Figure 2B:
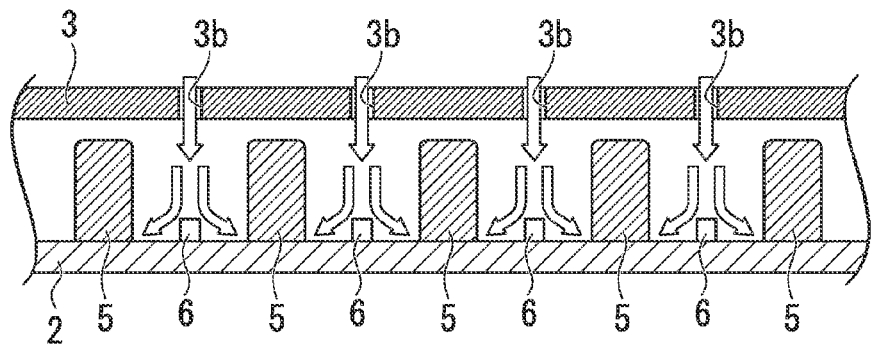
FIG. 2B is a drawing for describing the first embodiment of the present invention, being a cross-sectional view along A-A line of FIG. 2A.

FIG. 2A is a plan view that schematically shows the main portions of the inner surface side of the blade main body 2 (that is to say, a plan view that shows the outline constitution of the impingement cooling mechanism), and FIG. 2B is a cross-sectional view along A-A line of FIG. 2A. As shown in FIG. 2A and FIG. 2B, the plurality of impingement holes 3b are arranged with a regular distribution in the impingement plate 3, at for example the front side blade surface (blade front) 2d and the back side blade surface 2e. As shown in FIG. 2A, an impingement hole group 3bG that consists of five impingement holes 3b has a region that is arrayed in the vertical and horizontal directions of the drawing.

In these impingement hole groups 3bG, one direction among the arrayed vertical and horizontal directions is arranged along the flow direction of the crossflow CF. That is to say, the one direction of the impingement hole groups 3bG is arranged in the direction heading from the leading edge portion 2b to the trailing edge portion 2c (or, at some regions, oppositely in the direction heading from the trailing edge portion 2c to the leading edge 2b). With respect to these impingement hole groups 3bG, a blocking plate 5 (blocking member) is installed at the upstream side thereof in the flow direction of the crossflow CF. That is to say, the blocking plate 5 is installed on the upstream side of the crossflow CF with respect to the nearest impingement hole 3b on the downstream side of the crossflow CF.

The blocking plate 5 is arranged on the upstream side of the crossflow CF with respect to each impingement hole group 3bG. Thereby, the blocking plate 5 functions so as to inhibit the intrusion of the crossflow CF into the region between the impingement hole 3b and the blade main body 2. Also, the blocking plate 5, as shown in FIG. 2B, is formed on the blade main body 2, provided separately from the plate support 4, and formed at a position avoiding the plate support 4 with no overlapping therewith.

As shown in FIG. 2A and FIG. 2B, the plate support 4 is not formed in the region where the impingement hole group 3bG is formed. As shown in FIG. 1, the plate support 4 is arranged at a position that avoids the impingement hole group 3bG, the blocking plate 5, and moreover the turbulent flow promoting portion 6 described below. However, the present invention is not limited thereto. The plate support 4 may also be arranged in place of some of the impingement hole groups 3bG and the blocking plates 5. The plate support 4 may also be configured to function as the blocking plate 5. Also, the blocking plate 5 may also be formed on the impingement plate 3, rather than the blade main body 2.

The blocking plate 5 has, for example, a rectangular shape. The blocking plate 5, as shown in FIG. 2A, is formed with a width that is wider than the formation range in a direction perpendicular with the crossflow CF of the impingement hole group 3bG that consists of five of the impingement holes 3b. Also, the blocking plate 5, as shown in FIG. 2B, is formed so as to have a slight gap with the impingement plate 3, in consideration of ease of assembly. That is to say, the blocking plate 5 is formed to a height that is slightly lower than the gap between the blade main body 2 and the impingement plate 3, and thereby blocks the flow direction of the crossflow CF on the blade main body 2 side of the gap.

The distal end of the blocking plate 5 may also abut the outer surface of the impingement plate 3. Also, by installing film holes in the blade main body 2, it may also be used for film-cooling the blade surface utilizing a portion of the crossflow CF.

As shown in FIG. 2A, the blocking plate 5 once blocks the crossflow CF that is a flow of the cooling gas that has flowed in from the impingement holes 3b, and regulates a large portion thereof so as to flow in a direction perpendicular to the flow direction of the crossflow CF (that is to say, the plane direction of the blocking plate 5). That is to say, the blocking plate 5 regulates the cooling gas that has flowed in from the impingement holes 3b so as to once flow in the plane direction (the direction perpendicular with the flow direction of the crossflow CF), and then flow in the flow path R that is formed between adjacent impingement hole groups 3bG, 3bG and adjacent blocking plates 5, 5. Also, the blocking plate 5 also has a function of a fin. The blocking plate 5, by once blocking the flow of the cooling gas that has flowed in from the impingement holes 3b (crossflow CF), transmits the cold of the cooling gas to the blade main body, and cools the blade main body 2.

In the flow path R, the turbulent flow promoting portion 6 is respectively provided between adjacent impingement hole groups 3bG, 3bG and adjacent blocking plates 5, 5. The turbulent flow promoting portion 6 consists of a plate-shaped projection. The turbulent flow promoting portion 6 is formed on the blade main body 2, similarly to the blocking plate 5, as shown in FIG. 2B. The turbulent flow promoting portion 6 is for example formed to a height of approximately one-fifth the height of the blocking plate 5. Also, the turbulent flow promoting portion 6, as shown in FIG. 2A, is formed to nearly an equal width as the width of the flow path R (the width between adjacent blocking plates 5, 5).

By disturbing the crossflow CF that flows through the flow path R, and generating a turbulent flow between the impingement plate 3 and the blade main body 2, the turbulent flow promoting portion 6 functions so as to raise the heat transfer coefficient between the crossflow CF (turbulent flow) and the blade main body 2.

Accordingly, in the impingement cooling mechanism of the present embodiment and the turbine blade 1 that has this mechanism, most of the cooling gas that is ejected from the impingement holes 3 collides with (reaches) the blade main body 2 by the blocking plate 5 as described above, without being influenced by the crossflow CF. Thereby, it is possible to raise the cooling effect by the impingement cooling, and possible to increase the cooling effect also by the fin effect of the blocking plate 5.

Moreover, since the turbulent flow promoting portion 6 is provided in the flow path R of the crossflow CF, it is possible to increase the heat transfer coefficient between the crossflow CF and the blade main body 2 by disturbing the flow of the crossflow CF by the turbulent flow promoting portion 6.

Accordingly, it is possible to effectively utilize the cooling gas of a limited flow rate that is supplied from the impingement holes 3b, and further increase the cooling effect by the impingement cooling.

Second Embodiment

FIG. 3A and FIG. 3B are drawings for describing the turbine blade that has the impingement cooling mechanism of the present embodiment. FIG. 3A is a plan view that schematically shows the main portions of the inner surface side of the blade main body 2 (that is to say, a plan view that shows the outline configuration of the impingement cooling mechanism). Also, FIG. 3B is a cross-sectional view along A-A line of FIG. 3A.

The point of difference between the turbine blade (impingement cooling mechanism) of the present embodiment and the turbine blade (impingement cooling mechanism) shown in FIG. 2A and FIG. 2B is the point of the sizes of the blocking plate 5 and the turbulent flow promoting portion 6 not being uniform, and differing along the flow direction of the crossflow CF.

In contrast, the width of the blocking plate 5 that is arranged on the upstream side of the impingement hole group 3bG is relatively wider on the upstream side of the crossflow CF, and relatively narrower on the downstream side thereof. That is to say, the blocking plates 5 are formed so that the width little by little narrows heading from the upstream side to the downstream side of the crossflow CF. Thereby, the gap between the adjacent blocking plates 5 is narrow at the upstream side of the crossflow CF, and the gap between the adjacent blocking plates 5 is wide at the downstream side of the crossflow CF.

In the present embodiment, similarly to the first embodiment, by installing film holes in the blade main body 2 and utilizing a portion of the crossflow CF, it is possible to film-cool the blade surface. However, in the case of there being absolutely no film holes, or the case of there being extremely few film holes, whereas the flow rate of the crossflow CF is relatively low at the upstream, it increases as it heads to the downstream. In accordance with the flow rate change, the width between the blocking plates 5, 5 (that is to say, the width of the flow path R) widens heading to the downstream. Thereby, it is possible to flow the crossflow CF at a uniform flow velocity and in a stable manner along the flow path R.

In the flow path R that is formed as described above, the turbulent flow promoting portion 6 is formed similarly to the first embodiment. In the present embodiment, the width of the turbulent flow promoting portion 6 is also changed little by little heading from the upstream side to the downstream side of the crossflow CF. That is to say, the width of the turbulent flow promoting portion 6, which consists of a plate-shaped projection, is formed to be narrow at the upstream with respect to the width of the flow path R, and formed to be wide at the downstream. Accordingly, for the turbulent flow promoting portions 6 whose width is made to be changed as described above, the turbulent flow promoting effect is relatively low for those at the upstream whose width is narrow, and the turbulent flow promoting effect is relatively high for those at the downstream whose width is wide.

Accordingly, in the impingement cooling mechanism of the present embodiment and a turbine blade that has this mechanism, in addition to the same effects as the first embodiment being obtained, the turbulent flow promoting effect of the turbulent flow promoting portions 6 at the downstream where the flow rate of the crossflow CF increases is high. For this reason, in particular, it is possible to increase the heat transfer coefficient between the crossflow CF and the blade main body 2 at the downstream, and further increase the cooling effect by the impingement cooling including the crossflow CF. Moreover, at the upstream, the width of the blocking plate 5 is widened to increase the proportion of the cooling gas that collides therewith. For this reason, the fin effect of the blocking plate 5 increases, and it is possible to further increase the cooling effect by impingement cooling.

Third Embodiment

Figure 4A:
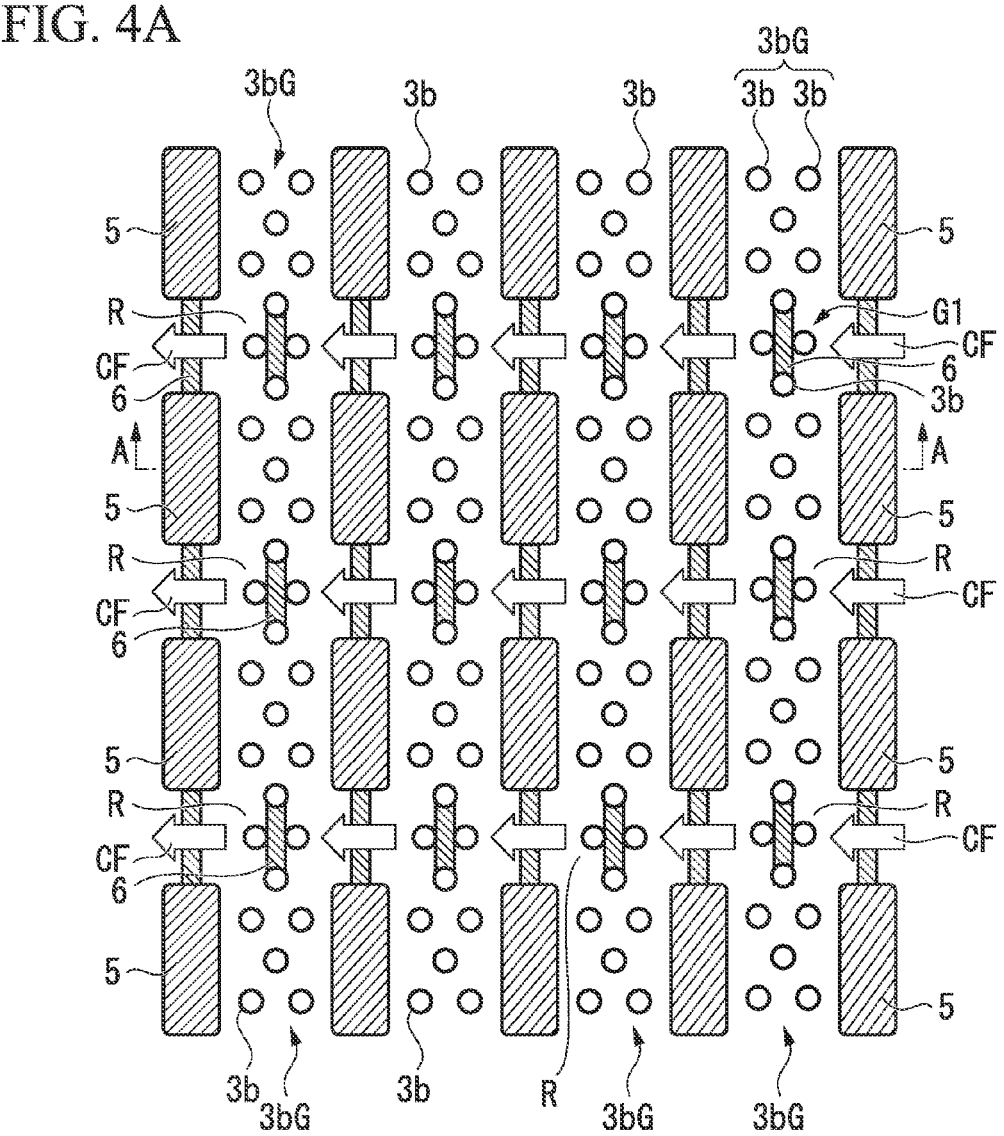
FIG. 4A is a plan view that schematically shows the main portions of the inner surface side of the blade main body for describing the third embodiment of the present invention.
Figure 4B:
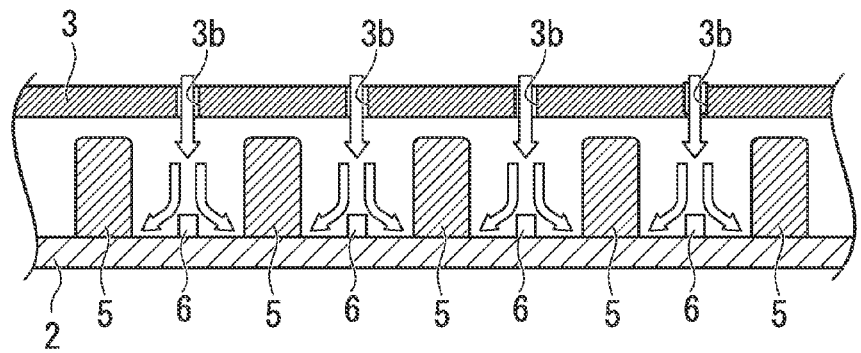
FIG. 4B is a drawing for describing the third embodiment of the present invention, being a cross-sectional view along A-A line of FIG. 4A.

FIG. 4A and FIG. 4B are drawings for describing a turbine blade that has the impingement cooling mechanism of the present embodiment. FIG. 4 is a plan view that schematically shows the main portions of the inner surface side of the blade main body 2 (that is to say, a plan view that shows the outline configuration of the impingement cooling mechanism). Also, FIG. 4B is a cross-sectional view along A-A line of FIG. 4A.

The point of difference between the turbine blade (impingement cooling mechanism) of the present embodiment and the turbine blade (impingement cooling mechanism) shown in FIG. 2A and FIG. 2B is the point of the impingement holes 3b being arranged in the flow path R of the crossflow CF that is regulated by the blocking plates 5. That is to say, in the present embodiment, an in-flow-path impingement hole group G1 that consists of four of the impingement holes 3b is formed in the flowpath between the impingement hole groups 3bG; 3bG. The blocking plates 5 are not installed on the upstream side of the crossflow CF (the upstream along the flow direction of the crossflow CF) with respect to the impingement holes 3b of these in-flow-path impingement hole groups G1.

In the present embodiment, the four impingement holes 3b that constitute the in-flow-path impingement hole group G1 are arranged at positions that become the vertices of a diamond. Also, the turbulent flow promoting portion 6 that consists of a plate-shaped projection is provided at a position corresponding to the center of these four impingement holes 3b.

In the present embodiment, the blocking plate 5 and the turbulent flow promoting portion 6 are formed on the blade main body 2. Accordingly, the relative positional relation of the impingement holes 3b (the impingement hole group 3bG, the in-flow-path impingement hole group G1), the blocking plate 5, and the turbulent flow promoting portion 6 are determined by the alignment accuracy when attaching the impingement plate 3 to the blade main body 2.

FIG. 4A and FIG. 4B show the positional relationship of the impingement holes 3b (the impingement hole group 3bG, the in-flow-path impingement hole group G1), the blocking plate 5, and the turbulent flow promoting portion 6 when correctly aligned as designed. Regarding the alignment when the impingement plate 3 is attached to the blade main body 2, in particular the alignment in the direction perpendicular with the flow direction of the crossflow CF is difficult, so it is not always the case that alignment can be correctly carried out as designed. When alignment cannot be carried out correctly, alignment is carried out again to be as designed. However, repeating this kind of alignment numerous times sharply reduces the productivity of the turbine blade (impingement cooling mechanism).

In the present embodiment, the impingement holes 3b are arranged in the flow path R as mentioned above. For this reason, even if there is some positional shifting of the impingement plate 3 with respect to the blade main body 2, there is functionally no hindrance. Thereby, it can be turned into a product with the position as is without redoing the alignment.

That is to say, the impingement holes 3b are arranged nearly uniform in a direction that is perpendicular to the flow direction of the crossflow CF. For that reason, when the impingement plate 3 is aligned with respect to the blade main body 2, even if the impingement plate 3 is positionally shifted with respect to the blade main body 2 in the direction perpendicular to the flow direction of the crossflow CF, some of the impingement holes 3b are blocked by the blocking plate 5 on the upstream side thereof, and the remainder are arranged in the flow path R. Accordingly, a state almost similar to the state shown in FIG. 4A results, and so there is no need to redo the alignment.

In the impingement cooling mechanism of the present embodiment and a turbine blade that has this mechanism, in addition to the same effects as the first embodiment being obtained, alignment of the impingement plate 3 with respect to the blade main body 2 is easy. As a result, productivity of the turbine blade (impingement cooling mechanism) increases.

Fourth Embodiment

Figure 5A:
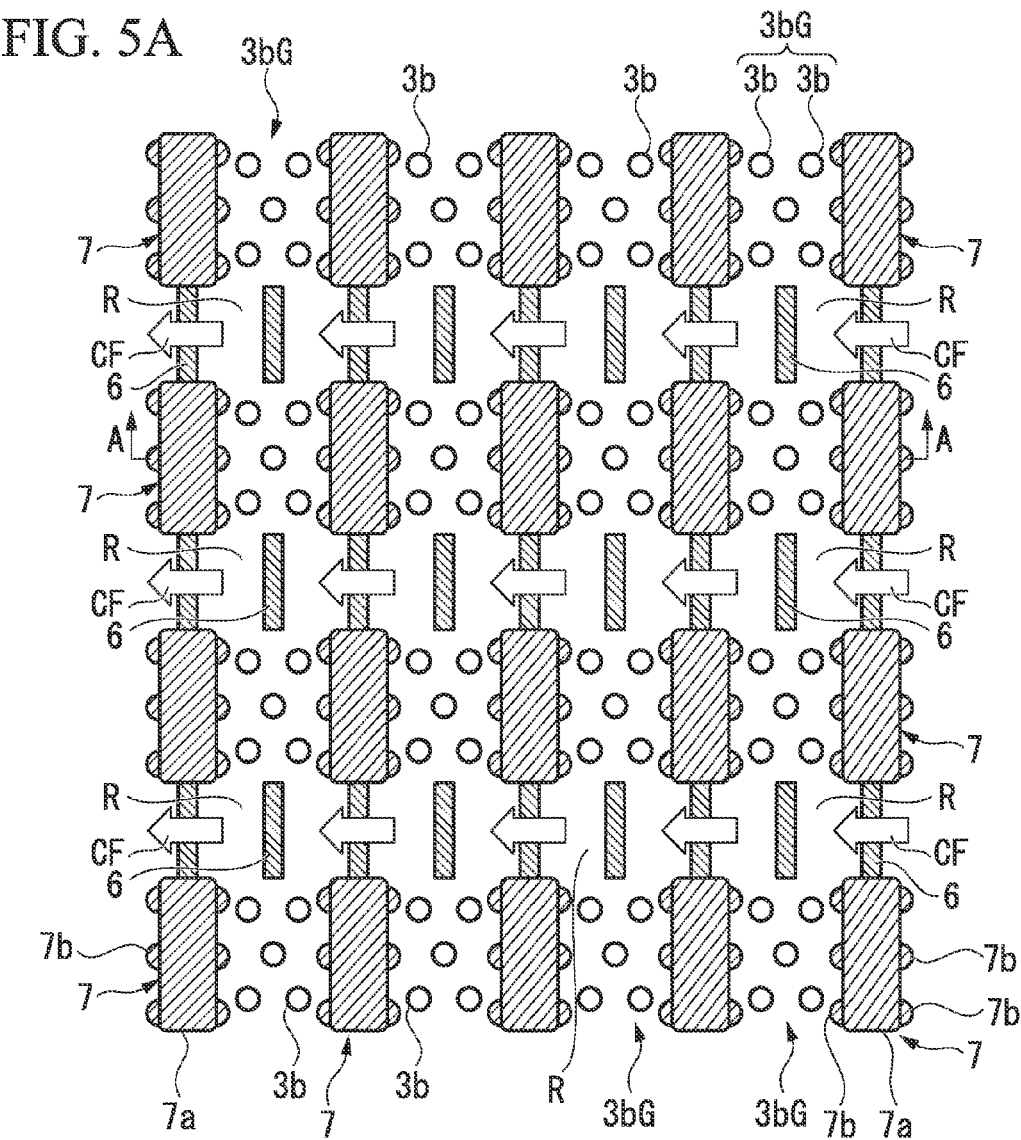
FIG. 5A is a plan view that schematically shows the main portions of the inner surface side of the blade main body for describing the fourth embodiment of the present invention.
Figure 5B:
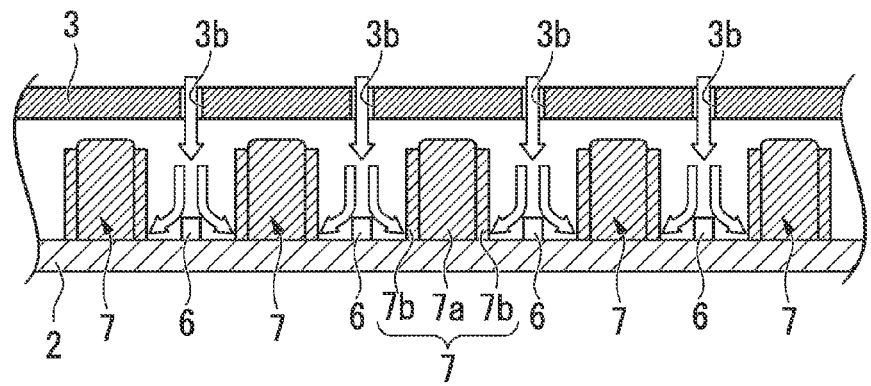
FIG. 5B is a drawing for describing the fourth embodiment of the present invention, being a cross-sectional view along A-A line of FIG. 5A.

FIG. 5A and FIG. 5B are drawings for describing a turbine blade that has the impingement cooling mechanism of the present embodiment. FIG. 5A is a plan view that schematically shows the main portions of the inner surface side of the blade main body 2 (that is to say, a plan view that shows the outline configuration of the impingement cooling mechanism). Also, FIG. 5B is a cross-sectional view along A-A line of FIG. 5A.

The point of difference between the turbine blade (impingement cooling mechanism) of the present embodiment and the turbine blade (impingement cooling mechanism) shown in FIG. 2A and FIG. 2B is in the shape of the blocking plate. That is to say, a blocking plate 7 of the present embodiment is formed having a plate-shaped portion 7a and protruding portions 7b that project out from the plate-shaped portion 7, as shown in FIG. 5A and FIG. 5B. The plate-shaped portion 7a is the same shape as the blocking plate 5 shown in FIG. 2A and FIG. 2B.

Accordingly, the blocking plate 7 of the present embodiment has a shape of the protruding portions 7b being provided to the blocking plate 5 shown in FIG. 2A and FIG. 2B. The protruding portion 7b, as shown in FIG. 5A and FIG. 5B, is an elongated protruding shape that is formed along the height direction of the protruding portion 7b, and three each are provided on both sides of the plate-shaped portion 7a (the upstream side and the downstream side in the flow direction of the crossflow CF).

The thermal transfer area and the heat capacity of the blocking plate 7 is larger compared to the blocking plate 5 shown in FIG. 2A and FIG. 2B by the addition of the protruding portions 7b.

Accordingly, the fin effect of the blocking plate 7 having the protruding portion 7b is higher compared to the blocking plate 5 of the aforementioned embodiments. For this reason, the turbine blade of the present embodiment that has the blocking plate 7 can further increase the cooling effect compared to the turbine blade of the first embodiment.

The shape and number of the protruding portion 7b are not limited to the elongated protruding shape shown in FIG. 5A and FIG. 5B. Various shapes can be adopted, and also it is possible to form an arbitrary number.

(Modifications)

Also, the arrangement relationship (impingement cooling mechanism) of the impingement hole 3b, the blocking plate 5 and the turbulent flow promoting portion 6 can be applied to nearly all regions of the front side blade surface 2d and the back side blade surface 2e on flat surfaces in the turbine blade 1 shown in FIG. 1, and can also be applied to the leading edge portion 2b with a curved shape.

Figure 6A:
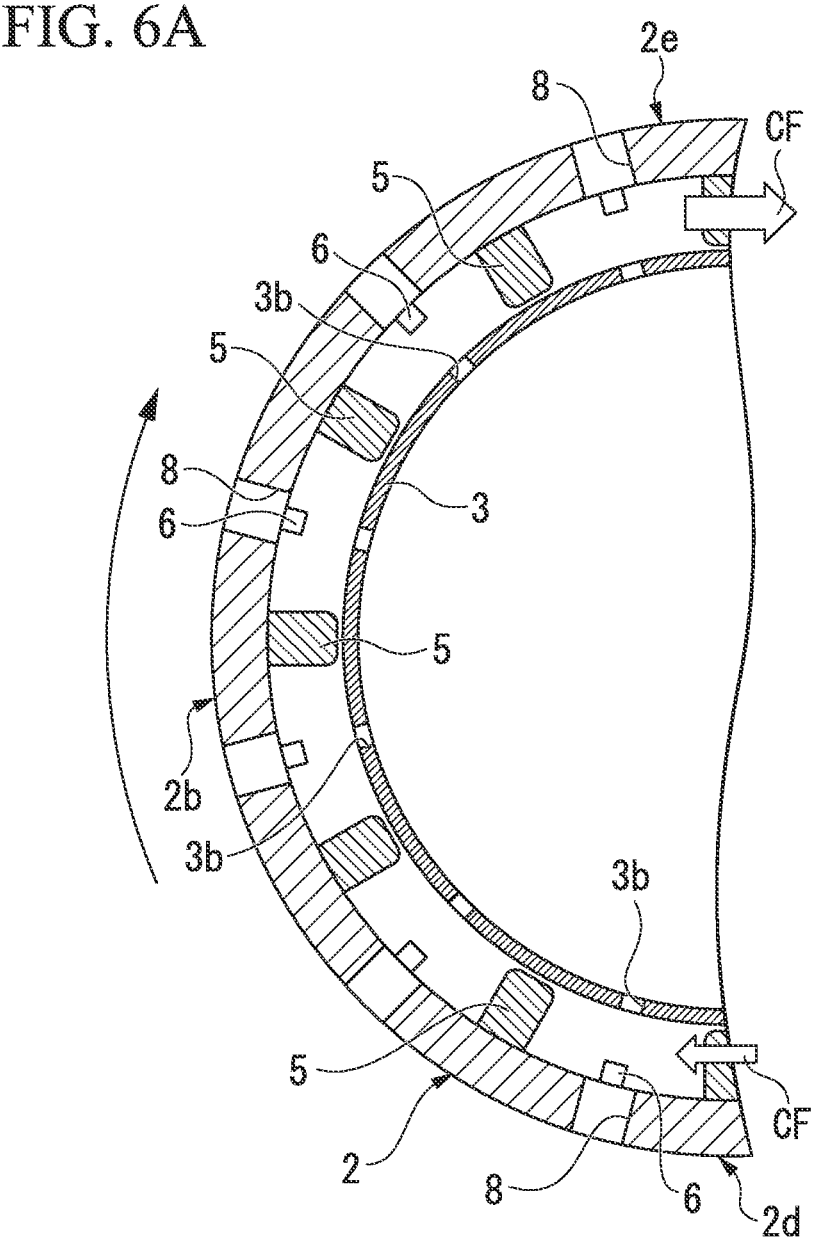
FIG. 6A is a side cross-sectional view of the leading edge portion of a turbine blade according to the present invention.
Figure 6B:
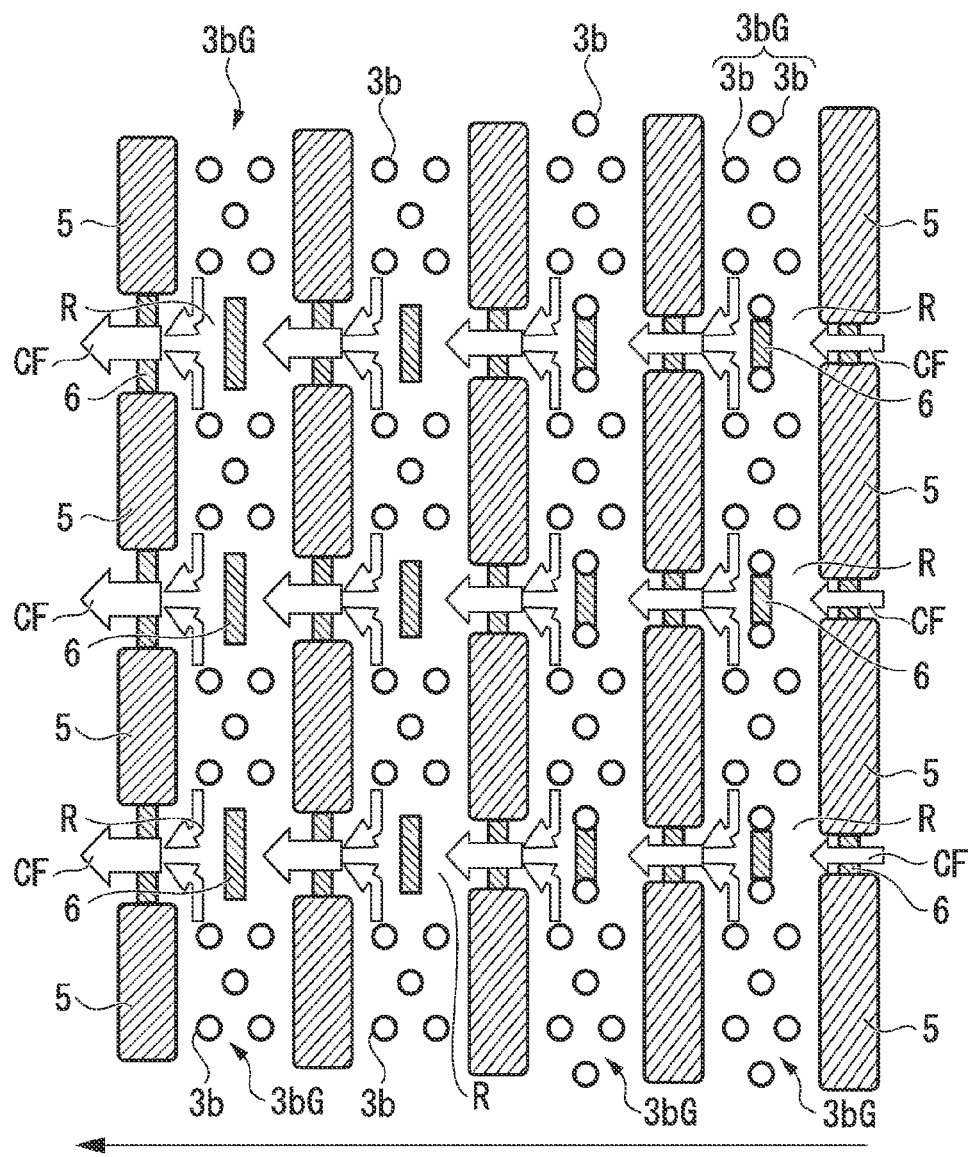
FIG. 6B is a development view of the inner surface side of the blade main body shown in FIG. 6A.

FIG. 6A and FIG. 6B are drawings that in particular show an example of the case of applying the arrangement relationship (impingement cooling mechanism) of the impingement hole 3b, the blocking plate 5 and the turbulent flow promoting portion 6 according to the aforementioned embodiments to the leading edge portion 2b of the turbine blade 1. FIG. 6A is a side cross-sectional view of the leading edge portion 2b. Also, FIG. 6B is a development view of the inner surface side of the blade main body 2 shown in FIG. 6A. Note that FIG. 6A and FIG. 6B respectively show the development direction with arrows.

As shown in FIG. 6A, a plurality of film holes 8 form a film cooling layer on the outer surface of the blade main body 2 by ejecting the cooling gas, and perform film cooling. Note that in the first embodiment to fourth embodiment shown in FIG. 2A to FIG. 5B, film holes (not illustrated) are formed on the blade main body 2 side. These film holes perform film cooling apart from impingement cooling.

As shown in FIG. 6A, at the leading edge portion 2b, the crossflow CF flows from the front side blade surface 2d to the back side blade surface 2e. Also, in the case of the number of film holes being few, the flow rate of the crossflow CF increases as it flows from the upstream (front side blade surface 2d) to the downstream (back side blade surface 2e). Accordingly, at the leading edge portion 2b, as the blocking plate 5 and the turbulent flow promoting portion 6, as shown in FIG. 6B, the same constitutions as the constitutions of the second embodiment shown in FIG. 3A are suitably used. That is to say, the width of the blocking plate 5 is formed to become narrow little by narrow heading from the upstream side to the downstream side of the crossflow CF. Thereby, among these blocking plates 5, the gap between adjacent blocking plates 5, 5 at the upstream side of the crossflow CF is narrow, and the gap between adjacent blocking plates 5, 5 at the downstream side of the crossflow CF is wide.

Also, the turbulent flow promoting portion 6 is formed in the flow path R that is regulated and formed by the blocking plate 5. The turbulent flow promoting portion 6 is also formed by changing its width little by little while heading from the upstream side to the downstream side of the crossflow CF. That is to say, the width of the turbulent flow promoting portion 6, which consists of a plate-shaped projection, is formed narrow at the upstream and wide at the downstream, corresponding to the width of the flow path R. Accordingly, for the turbulent flow promoting portions 6 whose width is made to be changed as described above, the turbulent flow promoting effect is relatively low for those at the upstream whose width is narrow, and the turbulent flow promoting effect is relatively high for those at the downstream whose width is wide.

Accordingly, the turbine blade (impingement cooling mechanism) of the present modification in which the constitution of the second embodiment is applied to the leading edge portion 2b can obtain the same effect as the second embodiment.

(Combustor)

Figure 7:
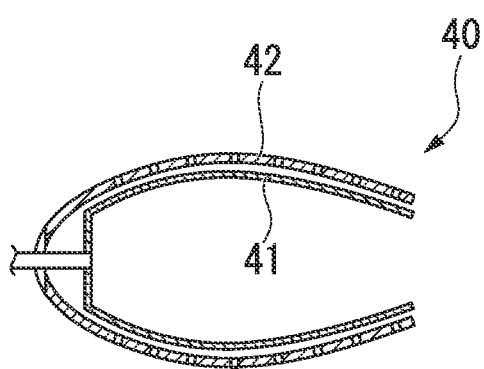
FIG. 7 is a cross-sectional view that schematically shows the outline constitution of a combustor provided with the impingement cooling mechanism according to the present invention.

In addition to a turbine blade, it is possible to apply the impingement cooling mechanism of the aforementioned embodiments to, for example, a combustor. FIG. 7 is a cross-sectional view that schematically shows an outline constitution of a combustor that is provided with the impingement cooling mechanism according to the first embodiment.

As shown in FIG. 7, a combustor 40 has a double-shell structure that is provided with an inner liner 41 and an outer liner 42. The inner liner 41 corresponds to the blade main body 2 that is the cooling target, and the outer liner 42 corresponds to the impingement plate 3 that is the facing member. By forming impingement holes (not illustrated) in the outer liner 42, and forming blocking plates (not illustrated) and turbulent flow promoting portions (not illustrated) on the inner liner 41, the combustor 40 is provided with the impingement cooling mechanism according to the first embodiment.

According to the impingement cooling mechanism of the first embodiment, it is possible to further increase the cooling effect by impingement cooling. For this reason, the combustor 40 that is provided with the impingement cooling mechanism has outstanding heat resistance.

Note that the combustor 40 can also adopt the constitution provided with the impingement cooling mechanism of any one of the second embodiment to the fourth embodiment, in place of the impingement cooling mechanism of the first embodiment.

Hereinabove, preferred embodiments of the present invention were described while referring to the appended drawings, but the present invention is not limited to the aforementioned embodiments. The various shapes and combinations of each constituent member shown in the embodiments described above refer to only examples, and may be altered in various ways based on design requirements and so forth within a scope that does not deviate from the subject matter of the present invention.

For example, as the blocking member according to the present invention, the blocking plate 5 with a rectangular plate shape is used in the embodiments. As this blocking member, it may also be for example a convex-shaped blocking plate in which the center portion projects out toward the upstream side of the crossflow CF, or a tubular (cylindrical) member that surrounds the direct-beneath of the impingement hole 3b (ejection side).

Also, regarding the turbulent flow promoting portion 6, a member consisting of a plate-shaped projection is used in the embodiments. It is also possible to constitute the turbulent flow promoting portion 6 by a pin-shaped projection, or a dimple (concavity) or the like. In that case, it is possible to arbitrarily set the number of pin-shaped projections or dimples.

Regarding the shape of the impingement hole 3*b*, it is possible to arbitrarily set it to a circular shape, an elliptical shape, a race-track shape or the like.

Note that the impingement cooling mechanism of the embodiments can be applied not only to a turbine blade and combustor, but also for example to a turbine shroud or a blade end wall or the like.

INDUSTRIAL APPLICABILITY

According to the present invention, it is possible to obtain an impingement cooling mechanism, a turbine blade, and a combustor that can effectively utilize the cooling gas of a limited flow rate that is supplied from impingement holes, and further increase the cooling effect by impingement cooling.

DESCRIPTION OF THE REFERENCE SYMBOLS

1: turbine blade; 2: blade main body (cooling target); 2*a*: interior space; 3: impingement plate (facing member); 3*a*: interior space; 3*b*: impingement hole; 3*b*G: impingement hole group; G1: in-flow-path impingement hole group; 5: blocking plate (blocking member); 6: turbulent flow promoting portion; 7: blocking plate (blocking member; 40: combustor; 41: inner liner; 42: outer liner; CF: crossflow; R: flow path

The invention claimed is:

1. An impingement cooling mechanism that ejects a cooling gas toward a cooling target from a plurality of impingement holes formed in a facing member that is disposed facing the cooling target, the impingement cooling mechanism comprising:
   blocking members configured to block a crossflow, which is a flow formed by the cooling gas after being ejected from the impingement holes, configured to be installed on at least the upstream side of the crossflow with respect to at least a portion of the impingement holes, and the blocking members comprise: a first plurality of blocking members arranged in a first row; and a second plurality of blocking members arranged in a second row such that each blocking members of the second plurality of blocking member is adjacent a respective blocking member of the first plurality of blocking members;
   a flow path of the crossflow formed between the first plurality of blocking members and the second plurality of blocking members; and
   turbulent flow promoting portions provided in the flow path, wherein a width of the turbulent flow promoting portions is nearly equal to a width between the adjacent first plurality of blocking members and the second plurality of blocking members.

2. The impingement cooling mechanism according to claim 1, wherein the blocking members are provided so that a gap between adjacent blocking members on the upstream side of the crossflow is narrow, and the gap between adjacent blocking members on the downstream side of the crossflow is wide.

3. The impingement cooling mechanism according to claim 1, wherein the turbulent flow promoting portions are provided so that the turbulent flow promoting effect becomes low at the upstream side of the crossflow, and the turbulent flow promoting effect becomes high at the downstream side of the crossflow.

4. The impingement cooling mechanism according to claim 1, wherein the impingement holes are arranged in the flow path of the crossflow that is regulated by the blocking members.

5. The impingement cooling mechanism according to claim 1, wherein each blocking member of the blocking members comprises:
   a plate-shaped portion; and
   protruding portions that project out from the plate-shaped portion.

6. A turbine blade comprising the impingement cooling mechanism according to claim 1.

7. A combustor comprising the impingement cooling mechanism according to claim 1.

8. The impingement cooling mechanism according to claim 2, wherein the turbulent flow promoting portions are provided so that the turbulent flow promoting effect becomes low at the upstream side of the crossflow, and the turbulent flow promoting effect becomes high at the downstream side of the crossflow.

9. The impingement cooling mechanism according to claim 1, wherein the turbulent flow promoting portions are positioned between the first plurality of blocking members and the second plurality of blocking members.

* * * * *